(12) United States Patent
Wolfe et al.

(10) Patent No.: US 6,353,957 B1
(45) Date of Patent: Mar. 12, 2002

(54) FLOOR MAINTENANCE MACHINE INCLUDING GEARBOX ARRANGEMENT

(75) Inventors: Jack Bruce Wolfe; Derrick Lee Hamm, both of Sparta, NC (US); Mike Travers Chappell, Fancy Gap, VA (US)

(73) Assignee: Pioneer Eclipse Corporation, Sparta, NC (US)

( * ) Notice: Subject to any disclaimer, the term of this patent is extended or adjusted under 35 U.S.C. 154(b) by 0 days.

(21) Appl. No.: 09/416,176

(22) Filed: Oct. 11, 1999

(51) Int. Cl.$^7$ .......................... A47L 11/14; A47L 11/40; F16H 3/00
(52) U.S. Cl. .................... 15/49.1; 15/98; 74/810.1; 451/353
(58) Field of Search ................ 15/49.1, 50.1, 15/98; 451/353; 74/810.1

(56) References Cited

U.S. PATENT DOCUMENTS

| | | | | |
|---|---|---|---|---|
| 102,697 A | * | 5/1870 | Morton ................ 74/810.1 X |
| 708,286 A | * | 9/1902 | Wild, Jr. ................ 74/810.1 |
| 981,032 A | | 1/1911 | Strange ................ 15/49.1 |
| 1,201,356 A | * | 10/1916 | Schenck ................ 74/810.1 |
| 1,847,323 A | | 3/1932 | Yutzler et al. ................ 15/49.1 |
| 1,991,756 A | * | 2/1935 | Lazich ................ 74/81.1 |
| 2,221,315 A | * | 11/1940 | Okun ................ 15/49.1 X |
| 2,273,626 A | | 2/1942 | Connell ................ 74/810.1 |
| 2,308,082 A | | 1/1943 | Johnson ................ 475/277 |
| 2,348,268 A | | 5/1944 | Smith ................ 15/49.1 |
| 2,496,572 A | | 2/1950 | Williams ................ 74/810.1 |
| 2,505,841 A | | 5/1950 | Shuker et al. ................ 74/810.1 |
| 2,537,057 A | | 1/1951 | Hulman et al. ................ 74/810.1 X |
| 2,561,279 A | | 7/1951 | Holt ................ 15/49.1 |
| 2,687,658 A | * | 8/1954 | Nelson et al. ................ 74/810.1 |
| 2,694,940 A | | 11/1954 | Schmitter ................ 74/810.1 X |
| 2,718,161 A | * | 9/1955 | Nelson et al. ................ 74/810.1 |
| 2,817,977 A | | 12/1957 | Holt ................ 15/49.1 X |
| 2,836,085 A | | 5/1958 | Snyder ................ 74/810.1 |
| 2,897,665 A | * | 8/1959 | Miller ................ 74/810.1 X |
| 2,903,901 A | * | 9/1959 | MacDonald ................ 74/810.1 X |
| 3,074,089 A | | 1/1963 | Brown, Jr. ................ 15/49.1 X |
| 3,146,633 A | * | 9/1964 | Schmitter et al. ................ 74/810.1 X |
| 3,517,574 A | | 6/1970 | Glatfelter ................ 74/810.1 |
| 3,580,110 A | | 5/1971 | Glecoe et al. ................ 74/810.1 |

(List continued on next page.)

FOREIGN PATENT DOCUMENTS

| | | | | |
|---|---|---|---|---|
| AU | 122980 | * | 12/1946 | ................ 74/810.1 |
| GB | 1440872 | * | 6/1976 | ................ 74/810.1 |

*Primary Examiner*—Mark Spisich
(74) *Attorney, Agent, or Firm*—Kennedy Covington Lobdell & Hickman, LLP

(57) ABSTRACT

A gearbox arrangement couples an input shaft to an output shaft whereby the output shaft is driven by the input shaft in a constant rotational direction but at two different rotational speeds depending upon the particular direction of rotation of an input shaft for a given rotational speed of the input shaft. The input shaft has an input gear integral therewith and the output shaft has an output gear integral therewith. A first unidirectional clutch couples the input shaft with the output shaft such that rotation of the input shaft in a first input direction at a first input speed rotates the output shaft in a first output direction at a first output speed, but rotation of the input shaft in a second, opposite input direction causes the first unidirectional clutch to slip. An idler gear meshes with and is driven by the input gear. An intermediate shaft has a first intermediate gear integral therewith. The first intermediate gear is meshed with and driven by the idler gear. A second intermediate gear is meshed with the output gear. A second unidirectional clutch couples the second intermediate gear with the intermediate shaft such that rotation of the input shaft in the second input direction at a second input speed rotates the output shaft in the first output direction at a second output speed, but rotation of the input shaft in the first input direction causes the second unidirectional clutch to slip. A floor maintenance machine utilizes the gearbox arrangement.

12 Claims, 9 Drawing Sheets

U.S. PATENT DOCUMENTS

| | | | |
|---|---|---|---|
| 3,619,848 A | | 11/1971 | Salzmann ................ 15/50.1 X |
| 3,666,063 A | * | 5/1972 | Schoeman et al. ..... 74/810.1 X |
| 3,711,065 A | | 1/1973 | Lawrence .............. 74/810.1 X |
| 3,712,155 A | | 1/1973 | Stommel et al. ........... 74/810.1 |
| 3,832,914 A | | 9/1974 | Pinfield ..................... 74/810.1 |
| 3,853,024 A | | 12/1974 | Vesci ........................ 74/810.1 |
| 3,929,038 A | | 12/1975 | Moser ....................... 74/810.1 |
| 3,981,208 A | | 9/1976 | Moses ....................... 74/810.1 |
| 4,115,890 A | | 9/1978 | Burgoon ..................... 15/49.1 |
| 4,122,576 A | | 10/1978 | Bevington et al. ........... 15/49.1 |
| 4,137,798 A | | 2/1979 | Sisk et al. .................... 475/12 |
| 4,237,571 A | | 12/1980 | Nelson ....................... 15/49.1 |
| 4,353,263 A | * | 10/1982 | Ciciora ................. 74/810.1 X |
| 4,358,868 A | | 11/1982 | Cook, Jr. .................... 15/49.1 |
| 4,393,534 A | | 7/1983 | Lee et al. ...................... 15/98 |
| 4,422,786 A | | 12/1983 | Piptone ................ 74/810.1 X |
| 4,475,872 A | | 10/1984 | Foughty ............... 74/810.1 X |
| 4,501,169 A | | 2/1985 | Stilin ........................ 74/810.1 |
| 4,590,635 A | | 5/1986 | Tucker et al. ................ 15/50.1 |
| 4,608,727 A | | 9/1986 | Schwab ........................ 15/98 |
| 4,633,541 A | | 1/1987 | Block ........................ 15/49.1 |
| 4,898,364 A | | 2/1990 | Shuker et al. ......... 74/810.1 X |
| 4,910,824 A | | 3/1990 | Nagayama et al. ............ 15/98 |
| 4,974,814 A | | 12/1990 | Cundy .................. 74/810.1 X |
| 5,127,124 A | | 7/1992 | Palmer et al. ................. 15/98 |
| 5,148,220 A | | 9/1992 | Hilbert et al. ......... 74/810.1 X |
| 5,333,517 A | | 8/1994 | Bryson et al. ......... 74/810.1 X |
| 5,416,943 A | | 5/1995 | Weltikol et al. ............. 15/49.1 |
| 5,494,271 A | | 2/1996 | Wun et al. ............ 74/810.1 X |
| 5,531,651 A | | 7/1996 | Yang .................... 74/810.1 X |
| 5,548,860 A | | 8/1996 | Weltikol et al. ............. 15/50.1 |
| 5,557,987 A | * | 9/1996 | Lotsch ...................... 74/810.1 |
| 5,608,939 A | | 3/1997 | Waldhauser et al. ........... 15/98 |
| 5,797,157 A | | 8/1998 | Gregg ........................ 15/49.1 |

* cited by examiner

FLOOR MAINTENANCE MACHINE INCLUDING GEARBOX ARRANGEMENT

FIELD OF THE PRESENT INVENTION

The present invention broadly relates to an output shaft driven by an input shaft through a gearbox arrangement and, in particular, to such an output shaft driven in a constant rotational direction but at two different rotational speeds depending upon the particular direction of rotation of the input shaft for a given rotational speed of the input shaft.

BACKGROUND OF THE PRESENT INVENTION

Gearbox arrangements having an output shaft driven in a constant rotational direction but at two different rotational speeds depending upon the particular direction of rotation of the input shaft for a given rotational speed of the input shaft are well known and are disclosed, for example, by Stilin U.S. Pat. No. 4,501,169, specifically relating to belt conveyors, and Glatfelter U.S. Pat. No. 3,517,574, specifically relating to handheld power drills.

In particular, Stilin discloses a two speed gearbox arrangement driven by a reversible motor and having unidirectional output. As shown in FIG. 1 of Stilin, the input shaft (14) is coaxial with and engages the output shaft (39) via a unidirectional clutch (37) for direct driven rotation of the output shaft when the input shaft is driven in a first rotational direction. The unidirectional clutch disengages from the output shaft when the input shaft is rotated in a second, opposite rotational direction to the first direction. In that case, the input shaft includes a pinion (20) which engages a triple reduction gear unit including a first intermediate shaft (22) and first and second gears (21,23) thereof, and a second intermediate shaft (25) and first and second gears (24,26) thereof. The reduction gear unit engages and drives a gear (27) keyed to a quill shaft (16) which, in turn, is coaxially disposed about the output shaft and coupled to the output shaft via a second unidirectional clutch (32). Moreover, the second clutch is disposed coaxially to and mounted for fixed rotation with the first clutch. When the input shaft is rotated in the second direction, the second clutch is arranged to engage the output shaft for driven rotation thereof by the input shaft through the gear reduction unit. Furthermore, while the output rotational speed may differ as a result of the gear reduction unit when the rotational direction of the input shaft is reversed for a given rotational speed of the input shaft, the direction of rotation of the output shaft remains the same whether the input shaft is driven in the first or second direction.

Glatfelter discloses in FIG. 2 a gearbox arrangement having an output shaft (3) driven by an input shaft (6) through selective coupling via a unidirectional clutch (8), whereby rotation of the input shaft in a first rotational direction results in direct driven rotation of the output shaft, but whereby rotation of the input shaft in a second, opposite rotational direction to the first direction does not result in direct driven rotation of the output shaft. Instead, the input shaft includes pinion (10) which engages and drives a gear reduction unit, including intermediate shaft (19) having first and second gears (20,22). In particular, first gear (20) is mounted to the intermediate shaft via a second unidirectional clutch (21) and second gear (22) engages a pinion (5) axially disposed on the output shaft. The second clutch is arranged such that rotation of the input shaft in the second direction results in coupled engagement between the first gear of the gear reduction unit and the pinion of the input shaft for driven rotation of the output shaft through the gear reduction unit. Again, while the output rotational speed may differ as a result of the gear reduction unit when the rotational direction of the input shaft is reversed for a given rotational speed of the input shaft, the direction of rotation of the output shaft remains the same whether the input shaft is driven in the first or second direction.

The present invention advances the state-of-the art by providing an additional gearbox arrangement that accomplishes the same input/output characteristics as the gearbox arrangements of Stilin and Glatfelter, but with a simpler and more economical structure specifically accommodating a floor maintenance machine. In this regard, patents are known to disclose floor maintenance machines, some of which have gearbox arrangements exhibiting the same characteristics of the input and output shafts discussed above, but none of which disclose or suggest the particular gearbox arrangement and floor cleaning machine of the present invention. These patents include U.S. Pat. Nos.: 5,797,157; 5,608,939; 5,548,860; 5,416,943; 5,127,124; 4,910,824; 4,633,541; 4,608,727; 4,590,635; 4,393,534; 4,358,868; 4,237,571; 4,122,576; 4,115,890; 3,619,848; 3,074,089; 2,817,977; 2,561,279; 2,348,268; 1,847,323; and 981,032.

SUMMARY OF THE PRESENT INVENTION

Briefly described, the present invention relates to a gearbox arrangement coupling an input shaft to an output shaft, wherein the output shaft is driven by the input shaft in a constant rotational direction but at two different rotational speeds depending upon the particular direction of rotation of an input shaft for a given rotational speed of the input shaft. The present invention includes: an input shaft having an input gear integral therewith; an output shaft having an output gear integral therewith; a first unidirectional clutch coupling said input shaft with said output shaft such that rotation of said input shaft in a first input direction at a first input speed rotates said output shaft in a first output direction at a first output speed, but rotation of said input shaft in a second, opposite input direction causes said first unidirectional clutch to slip; an idler gear meshed with and driven by said input gear; an intermediate shaft having a first intermediate gear integral therewith, said first intermediate gear meshed with and driven by said idler gear; a second intermediate gear meshed with said output gear; and a second unidirectional clutch coupling said second intermediate gear with said intermediate shaft such that rotation of said input shaft in said second input direction at a second input speed rotates said output shaft in said first output direction at a second output speed, but rotation of said input shaft in said first input direction causes said second unidirectional clutch to slip.

In features of the present invention, the input shaft is coaxial to the output shaft; the first and second unidirectional clutches are coplanar; the unidirectional clutch is interposed within said output gear; the second unidirectional clutch is interposed within said second intermediate gear; the output gear is formed as part of said output shaft; and the input gear, the idler gear, and the first intermediate gear are coplanar.

In further features of the present invention, the first output speed differs from the second output speed when the first input speed equals the second input speed. Preferably, the first and input speeds each equal approximately 2000 rpm and the first output speed equals approximately 2000 rpm and the second output speed equals approximately 300 rpm.

The present invention also includes a floor maintenance machine utilizing the aforementioned gearbox arrangement whereby the machine can be selectively used for buffing, scrubbing, and stripping. The floor maintenance machine of the present invention further includes a switch for controlling the direction of rotation of the input shaft of the gearbox, and includes an adjustable floor support member for varying the weight supported by a pad of the machine against the floor surface.

BRIEF DESCRIPTION OF THE DRAWINGS

The preferred gearbox arrangement of the present invention will now be described in detail with reference to the accompanying drawings, wherein.

DETAILED DESCRIPTION OF A PREFERRED EMBODIMENT

Figure 1:
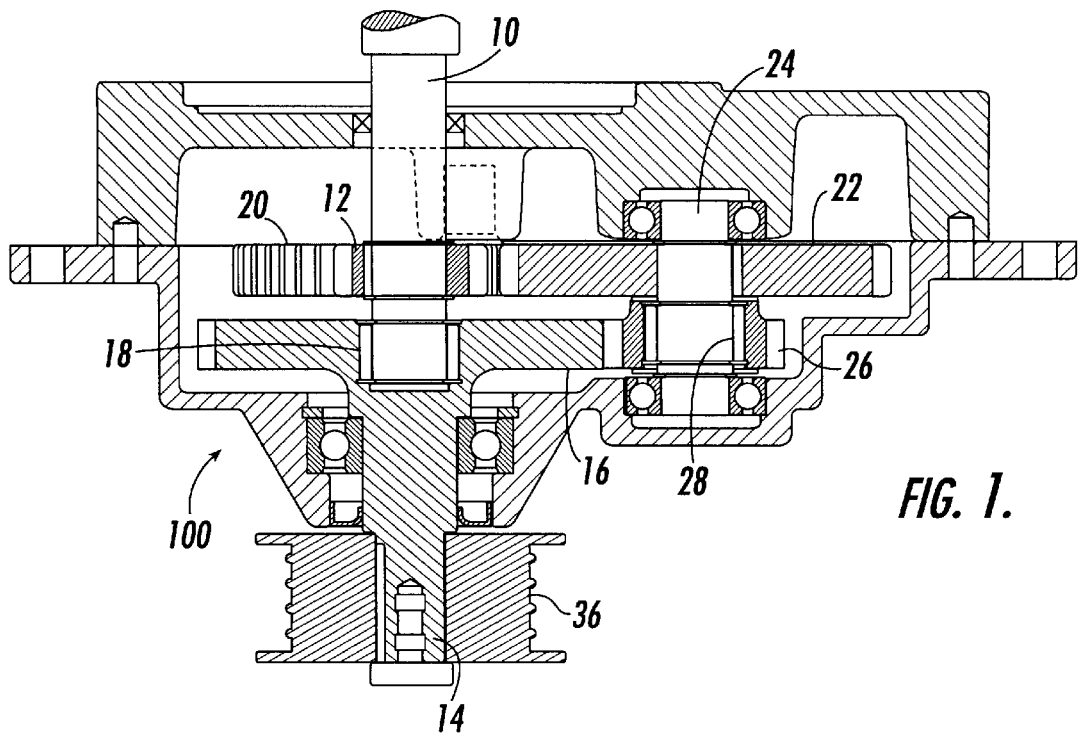
FIG. 1 is an elevational view in cross-section of a gearbox arrangement of the present invention.
Figure 2:
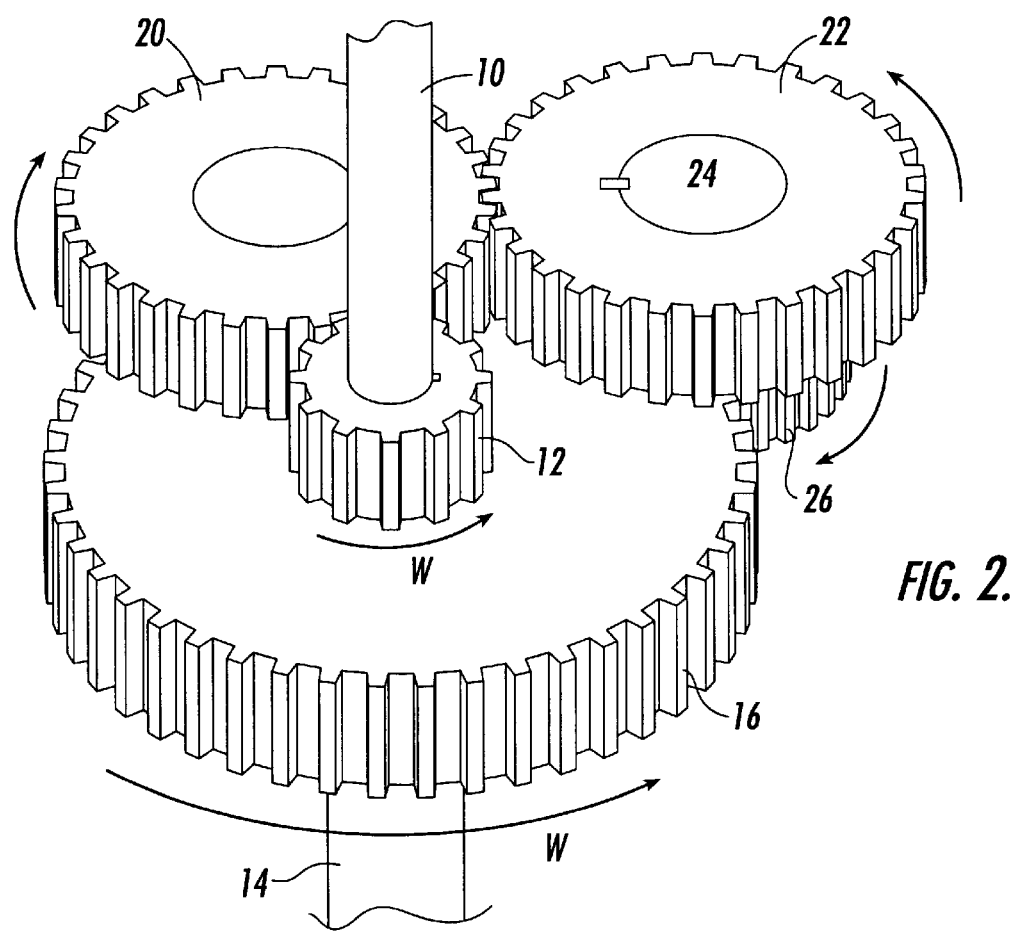
FIG. 2 is a perspective view of the operation of the gears of the gearbox arrangement of FIG. 1 when an input shaft thereof is driven in a first rotational direction.
Figure 3:
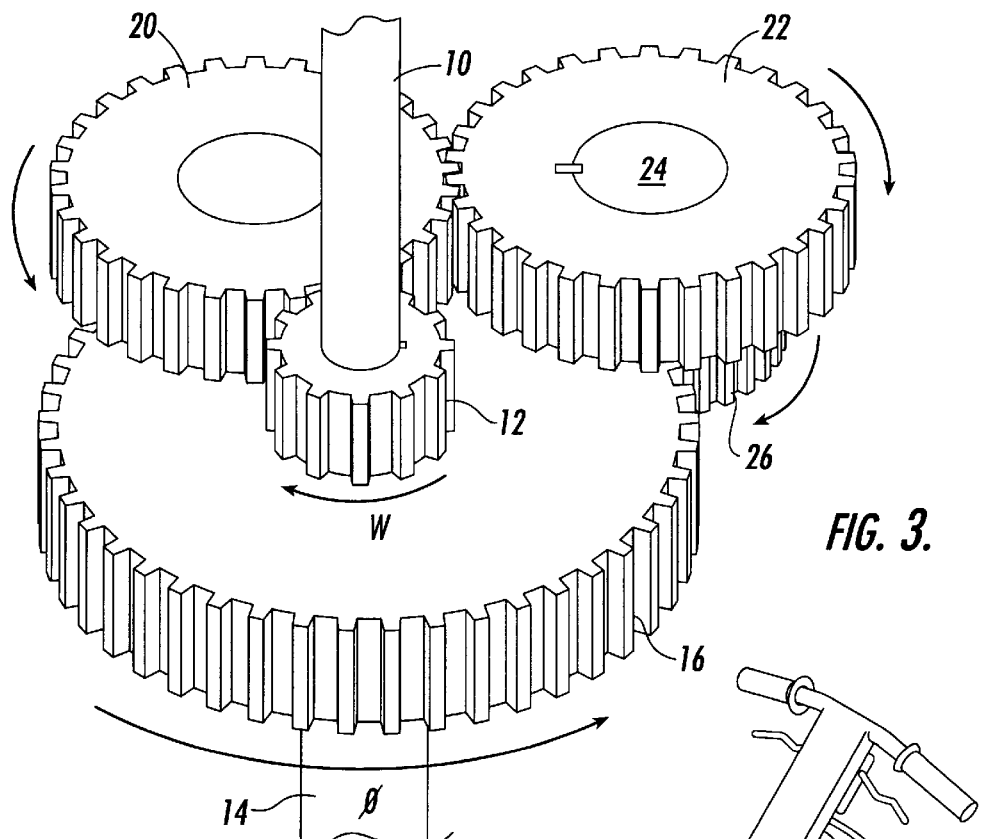
FIG. 3 is a perspective view of the operation of the gears of the gearbox arrangement of FIG. 1 when the input shaft is driven in a second rotational direction opposite to the first rotational direction of FIG. 2.

With reference now to FIGS. 1–3, the preferred gearbox arrangement 100 of the present invention includes an input shaft 10 coupled to an output shaft 14 via a first unidirectional clutch 18. In particular, the first unidirectional clutch 18 is fixed to the input shaft 10 and coaxially interposed within an output gear 16 that itself is integral with the output shaft 14. The gearbox arrangement also includes a gear reduction unit which comprises an input gear 12 keyed to the input shaft 10 and disposed in meshing engagement with an idler gear 20. The gear reduction unit further includes a first intermediate gear 22 intermeshed with the idler gear 20 and keyed to an intermediate shaft 24, and a second intermediate gear 26 intermeshed with the output gear 16 and selectively coupled to the intermediate shaft 24 by a second unidirectional clutch 28. In particular, the second unidirectional clutch 28 is fixed to the intermediate shaft 24 and is coaxially interposed within the second intermediate gear 26.

Preferably, the input shaft 10 is disposed coaxial to the output shaft 14, and the input gear 12, the idler gear 20, and the first intermediate gear 22 are disposed substantially in coplanar relation. Likewise, the first unidirectional clutch 18 and the second unidirectional clutch 28 preferably are disposed substantially in coplanar relation.

As shown in FIG. 2, when the input shaft is driven in a first input direction, the first unidirectional clutch 18 is arranged such that rotation of the input shaft 10 in the first input direction results in engagement of the first unidirectional clutch 18 and direct coupling between the input shaft 10 and the output shaft 14. Thus, the input shaft 10 directly drives rotation of the output shaft 14 in a first output direction when the input shaft 10 is driven in the first input direction. With regard to the gear reduction unit, the input gear 12 drives the idler gear 20 which, in turn, drives the first intermediate gear 22 and the intermediate shaft 24 in the first input direction. However, the second unidirectional clutch 28 fixed to the intermediate shaft 24 is arranged such that it slips when rotated in the first input direction, whereby the intermediate shaft 24 is uncoupled from the second intermediate gear 26. Consequently, driven rotation of the output shaft 14 by the gear reduction unit is bypassed when the input shaft 10 is rotated in the first direction.

On the other hand, rotation of the input shaft 10 in a second, opposite input direction as shown in FIG. 3 results in the first unidirectional clutch 18 slipping and uncoupling of the input shaft 10 from the output shaft 14. In this case, the input gear 12 drives the idler gear 20 which, in turn, drives the first intermediate gear 22 and the intermediate shaft 24 in the second, opposite input direction. When driven in the second, opposite input direction, the second unidirectional clutch 28 engages and couples the intermediate shaft 24 with the second intermediate gear 26. Consequently, the intermediate shaft 24 drives the second intermediate gear 26 which, in turn, drives the output gear 16 and the output shaft 14 integral therewith. Moreover, the output shaft is still driven in the first output direction even though it is now driven by the gear reduction unit.

Because of the use of the gear reduction unit, desired gear ratios can be achieved at the outset by selective use of differently sized gears such that the resulting speed of the output shaft can be selected as a multiple of the input speed when the direction of rotation of the input shaft is changed. In the preferred embodiment, the gear reduction unit includes a combination of gears that result in an output speed of 0.175 that of the input speed. Thus, driven rotation of the input shaft 10 at a speed W of 2000 rpm in the first input direction directly drives the output shaft 14 at a speed W of 2000 rpm in the first output direction, and driven rotation of the input shaft 10 at a speed W of 2000 rpm in the second input direction results in driven rotation of the output shaft 14 by the gear reduction unit at an output speed φ of 300 rpm in the first output direction.

Furthermore, in order to provide for selective rotation of the input shaft at a speed W of 2000 rpm, the input shaft 10 preferably is driven by a reversible motor that may be either a constant-speed motor-resulting in two possible output speeds, or a variable-speed motor-resulting in two different ranges of possible output speeds.

Figure 4:
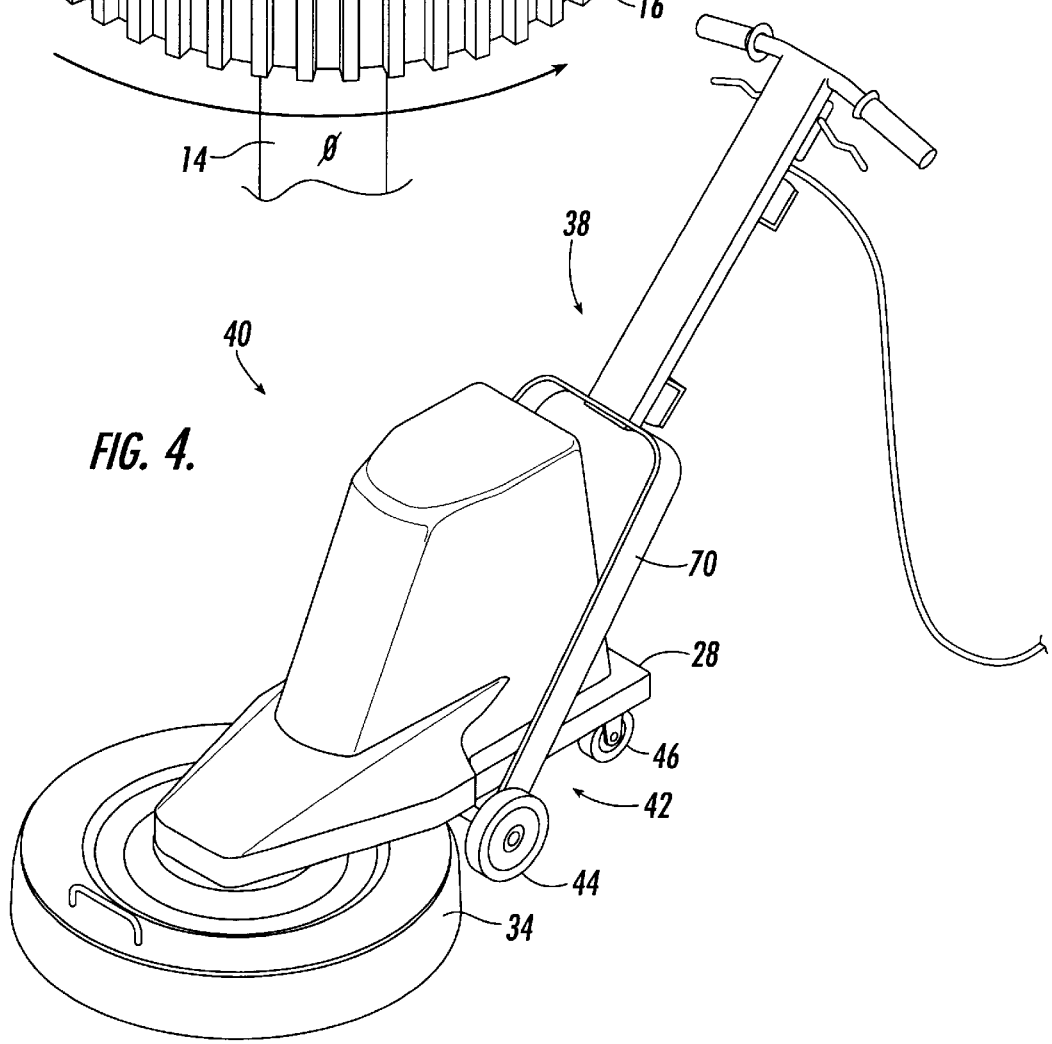
FIG. 4 is a perspective view of a floor maintenance machine including the gearbox arrangement of FIG. 1.

The preferred gearbox arrangement 100 of the present invention is intended to be used with a floor maintenance machine 40 as shown, for example, in FIG. 4. The gearbox arrangement permits selected rotational speeds of a pad of both 2,000 rpm and 300 rpm obtainable simply by reversing the rotational direction of the input shaft that is driven by a reversible motor. Important benefits provided by the gearbox arrangement include compactness thereof for inclusion in a floor cleaning machine as well as simplicity of manufacture.

Generally, the preferred floor maintenance machine 40 includes a chassis 28 to which is secured a reversible motor 30, and a gearbox 32 including the gearbox arrangement 100. The gearbox 32 is disposed below the motor 30 and is secured to the chassis 28. The floor maintenance machine 40 also includes a location for mounting of a pad (not shown) for rotation within a pad housing 34 below the chassis 28, and a conventional pulley drive train (not shown) that connects the pad to the output shaft 14 of the gearbox arrangement 100 for driven rotation of the pad. In particular, as shown in FIG. 1, a wheel 36 is fixedly mounted on the output shaft 14 and drives a belt (not shown) in conventional manner. The floor maintenance machine 40 also includes a handlebar assembly 38 for maneuvering of the machine 40, and a wheel assembly 42 for support and movement of the machine 40. The motor 30 and gearbox 32 are preferably offset to the pad housing 34 in order for easy disposition of the pad housing 34 under tables and chairs during use of the machine. Furthermore, the components of the machine are arranged to locate the center of mass CM of the machine 40 at a predetermined disposition relative to the chassis 28 as described in greater detail below.

The preferred floor maintenance machine 40 represents a high-speed buffer as well as a low-speed scrubber/stripper. Specifically, when the input shaft 10 is driven by the motor 30 in the first input direction at the speed W of 2000 rpm, the gear reduction unit is bypassed and the output shaft 14 is driven in the first output direction at the speed W of 2000 rpm. This rotates the wheel 36 at the speed W of 2000 rpm in the first output direction and drives the belt at a high speed which, in turn, drives rotation of a buffing pad mounted within the pad housing 34 at a high speed.

When the input shaft 10 is driven by the motor 30 in the second, opposite input direction at the speed W of 2000 rpm, the gear reduction unit is not bypassed and the output shaft 14 is driven at the speed φ of 300 rpm in the first output direction. This rotates the wheel 36 at the speed W of 300 rpm in the first output direction and drives the belt at a low speed which, in turn, drives rotation of a scrubber/stripper pad mounted within the pad housing 34 at a low speed.

In operation of the machine 40, rotation of a pad at a high buffing speed creates an area of low pressure within the pad housing 34 which results in a buffing pad being pulled toward the floor surface being cleaned. In order to counteract this force, the wheel assembly 42 includes a primary floor support member comprising front wheels 44 that are slidably secured to the chassis 28 of the machine 40 through a wheel assembly mounting structure (described in detail below) for selective positioning relative to the chassis 28 in a horizontal direction substantially parallel to the pad housing 34. Specifically, the front wheels 44 are selectively slidable between three positions.

Figure 5:
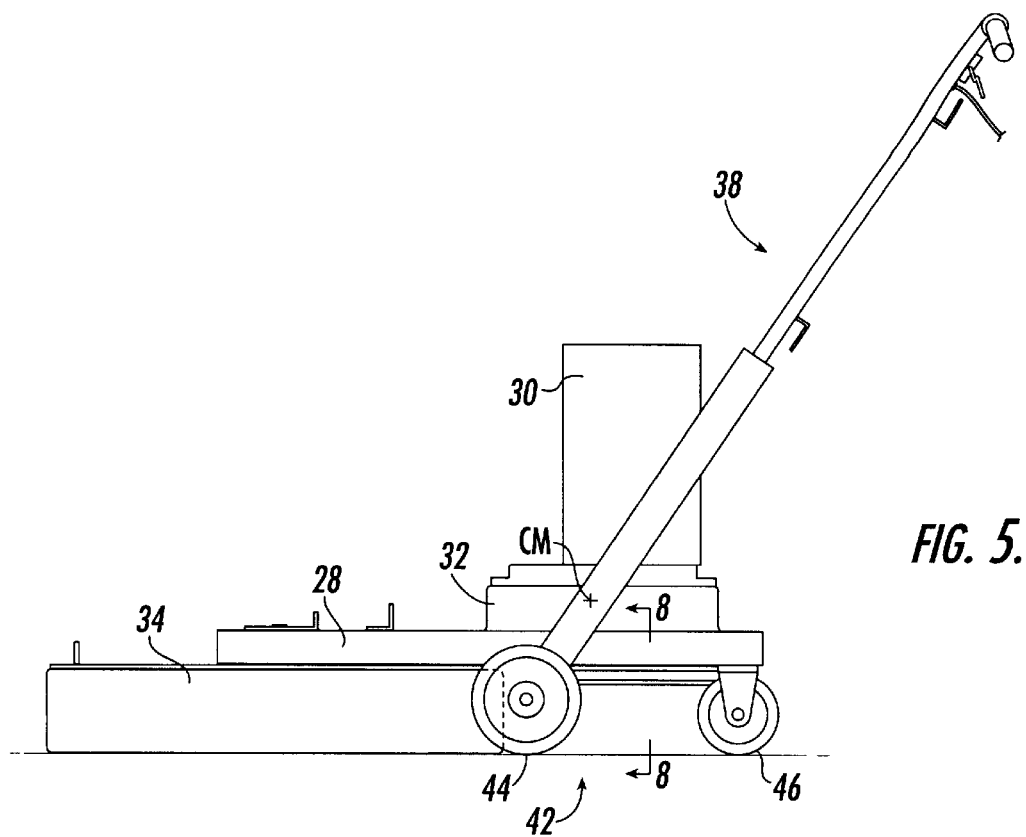
FIG. 5 is an elevational view of a side of the floor maintenance machine of FIG. 4 (without the cover) in which the wheels are disposed in a forward position.

In a first position as shown in FIGS. 4 and 5, the center of mass CM of the machine 40 is located to the rear of the front wheels 44 and forward of the rear wheels 46 whereby the machine 40 is supported on all four wheels 44,46. In this disposition, the force of gravity acting on the machine 40 will tend to counteract the force acting on the pad created by the decreased pressure within the pad housing 34, thereby keeping excessive pressure from being applied to the pad during buffing. Furthermore, when the machine 40 is turned off and the decreased pressure dissipates, rear wheels 46 of the wheel assembly 42 engaging the floor surface support of the machine 40 and keep it from tilting over under the force of gravity.

When a pad is rotated within the pad housing 34 at the low speed for either scrubbing or stripping, the decreased pressure within the pad housing 34 is not created and the counterbalancing of the machine 40 about the front wheels 44 is not required. In this situation, the front wheels are slidably disposed into either the second (see FIG. 6) or third (see FIG. 7) of the three positions wherein the center of mass CM of the machine 40 is located forward of the front wheels 44. Furthermore, in this position, a greater amount of the weight of the machine 40 is supported by the pad and, in fact, the rear wheels 46 are lifted off of the floor surface as shown in FIGS. 6 and 7.

Figure 6:
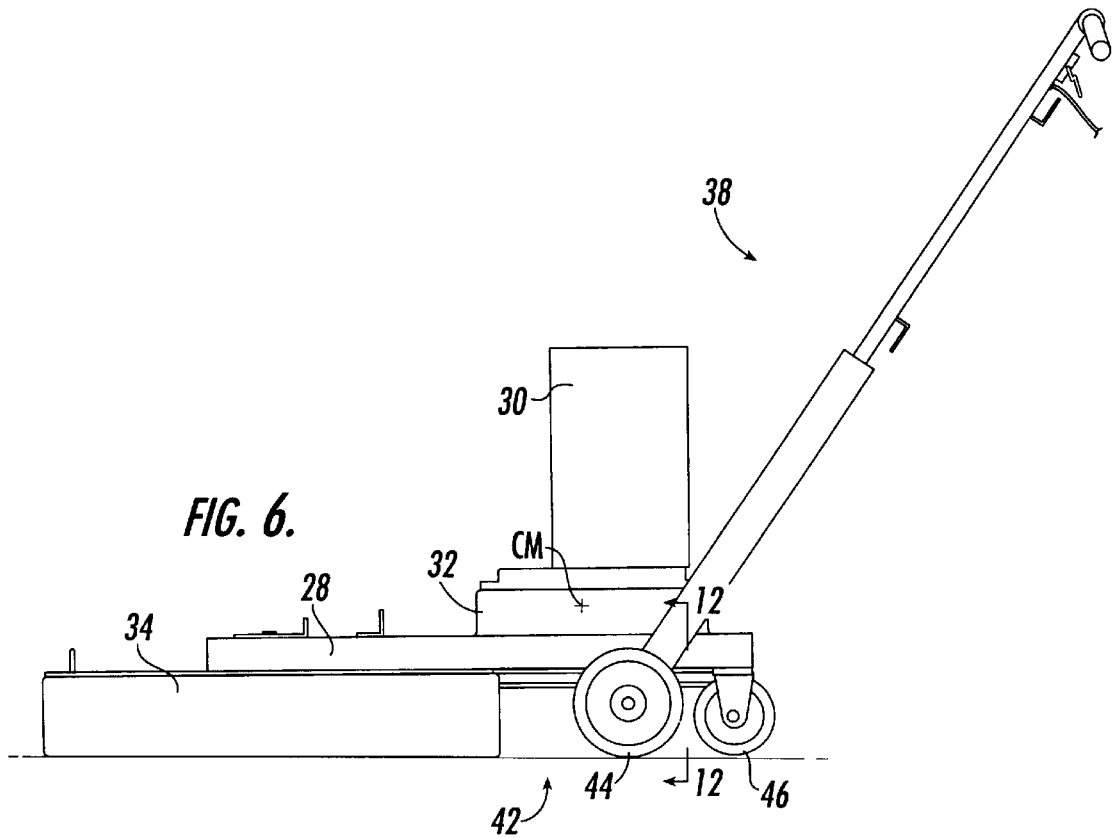
FIG. 6 is another elevational view in accordance with FIG. 5 in which the wheels are disposed in an intermediate position.

In particular detail, when the machine 40 is used for scrubbing, the front wheels 44 are disposed in the second position as shown in FIG. 6. The force of gravity acting on the machine thereby tends to press the pad into the floor with the pad actually supporting a portion of the weight of the machine 40. The weight of the machine 40 supported by the pad in this second position, combined with the increased torque of the pad arising from the gear reduction unit of the gearbox 32, enables the pad to be used as a scrubber for effective cleaning of the floor.

Figure 7:
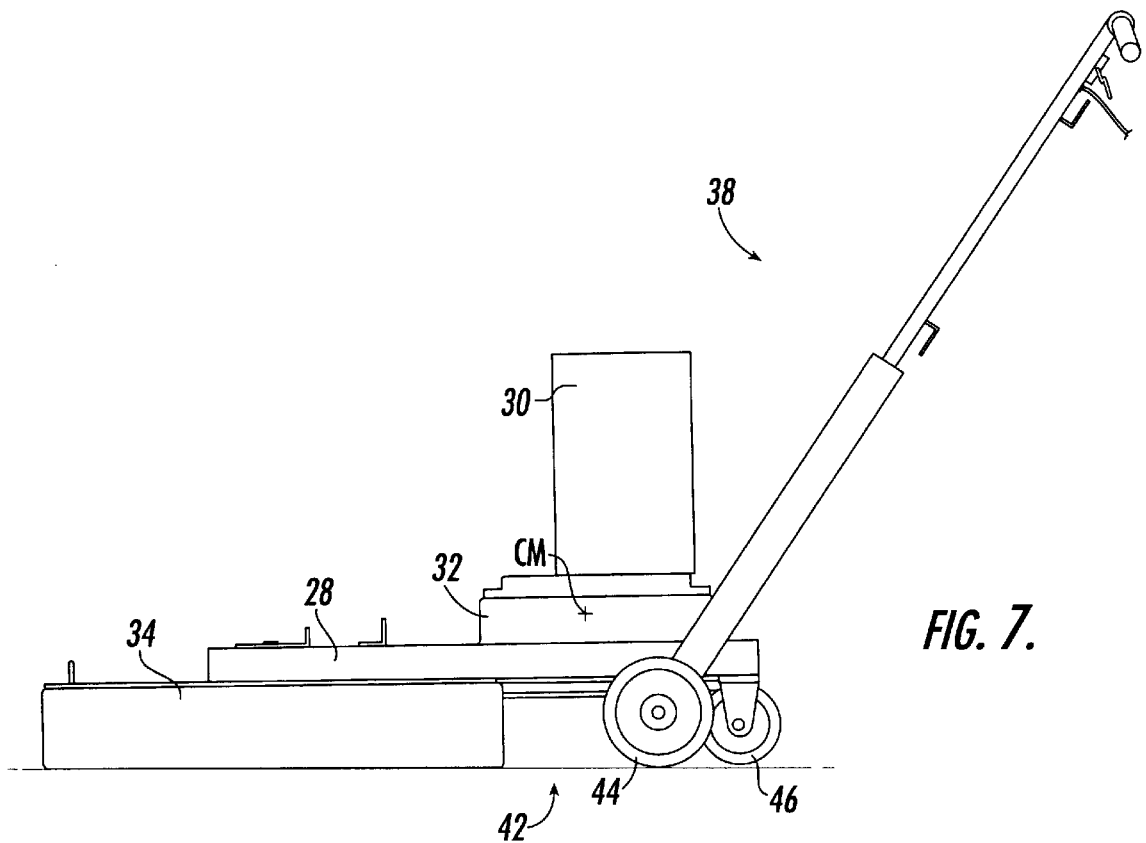
FIG. 7 is yet another elevational view in accordance with FIG. 5 in which the wheels are disposed in a rearward position.

When the machine 40 is used for stripping, the front wheels 44 are disposed in the third position, as shown in FIG. 7. In this third position the center of gravity is disposed even further forward of the front wheels 44 with the result that an even greater weight of the machine 40 is supported by the pad. In this third position the greater weight of the machine 40 supported by the pad, again combined with the increased torque by which the pad is rotated resulting from the gear reduction unit of the gearbox 32, enables the pad to be used effectively as a stripper removing any film from the surface of the floor.

Without the variation in the speed of rotation of a pad mounted within the pad housing 34 that is provided by the gearbox arrangement of the present invention, the ability of the machine 40 to perform the three different functions of buffing, scrubbing and stripping would be significantly inhibited. Furthermore, the lack of the ability to adjust the weight of the machine 40 supported by a pad mounted within the pad housing 34 also would significantly inhibit the effectiveness of the machine 40. Whereas scrubbing and stripping each requires greater pressure between a pad and the floor surface as well as greater torque in rotating the pad, buffing requires less pressure between the pad and the floor surface as well as higher rotational speeds of rotation of the pad. Indeed, the application of pressure during buffing at levels required for effective scrubbing and stripping tends to lead to binding of the motor, and the application of pressure during scrubbing and stripping at levels required for effective buffing results in poor scrubbing and stripping of the floor surface.

The particular wheel assembly mounting structure which permits the slidable disposition of the front wheels 44 into the three different positions will now be described in detail with reference to FIGS. 8–13. Specifically, each front wheel 44 is mounted for rotation on opposite ends of an axle 48. The axle 48 itself extends through and is supported by mounting brackets 50 each of which is disposed on opposite sides of the chassis 28. Moreover, each mounting bracket 50 is supported on the chassis 28 by a pair of rollers 52 that are fixed to the mounting bracket 50 and that are disposed within a respective channel 54 of the chassis 28 located on opposite sides thereof. The front wheels 44 and the mounting brackets 50 which support them are thereby free to slide on rollers 52 within the channels 54 forwardly and rearwardly along the chassis 28.

In order to lock the front wheels 44 in each of the three positions, a support plate 56 extends across the underside of the chassis 28 and is welded to the two mounting brackets 50. The support plate 56 thereby secures the two mounting brackets 50 in alignment. A locking pin 58 is mounted to the support plate 56 adjacent each side of the chassis 28 and extends vertically toward the underside surface of the chassis 28. Furthermore, each locking pin 58 includes an end 60 that is biased by a spring 64 to extend through each of three respective openings 62 disposed in the underside surface of the chassis 28 when the front wheels 44 are disposed in each of the three positions.

Figure 8:
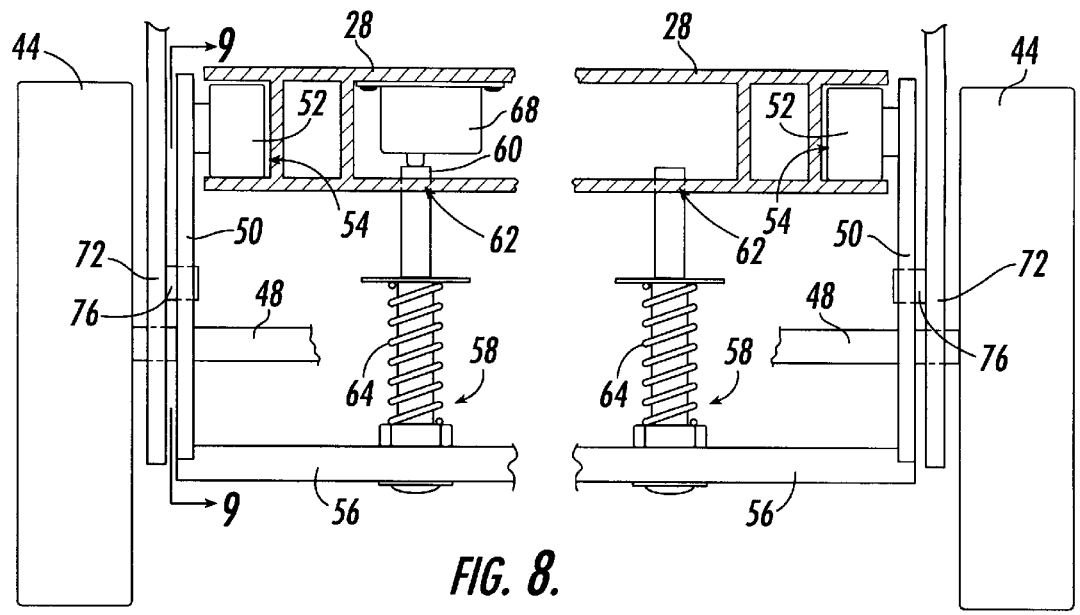
FIG. 8 is an elevational view in cross-section of the portion of the machine of FIG. 5 taken along the line 8—8.
Figure 9:
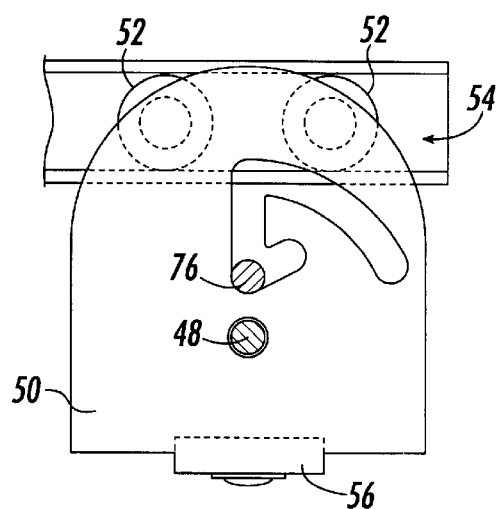
FIG. 9 is an elevational view in cross-section of the portion of the machine of FIG. 8 taken along the line 9—9.
Figure 10:
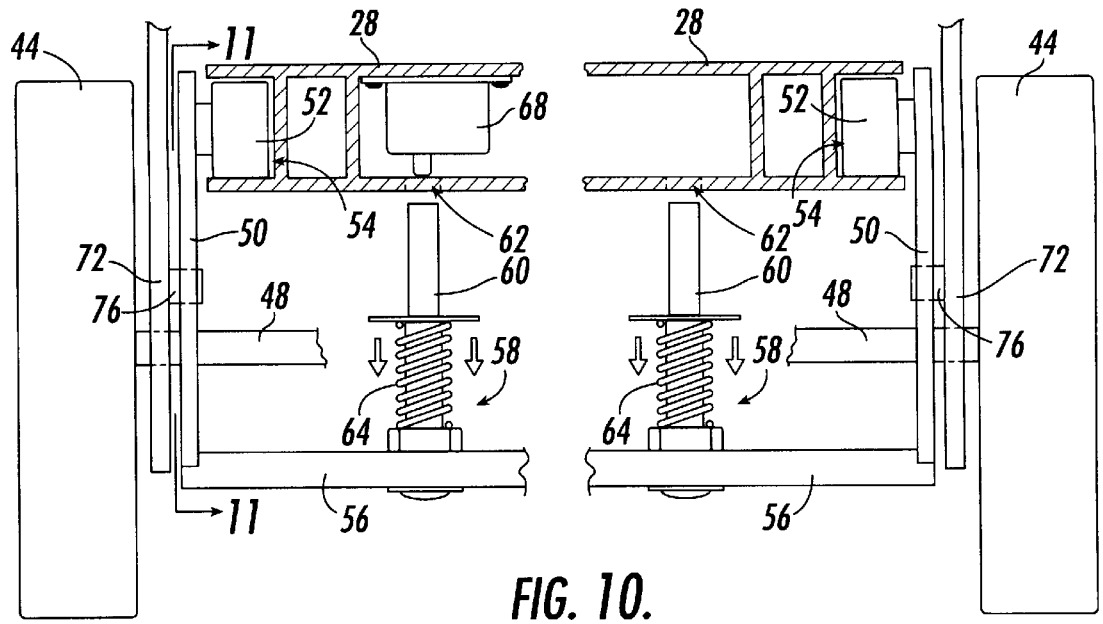
FIG. 10 is another elevational view in accordance with FIG. 8.
Figure 11:
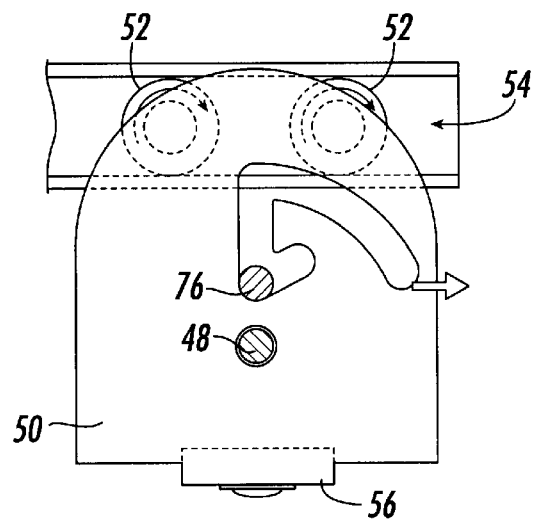
FIG. 11 is an elevational view in cross-section of the portion of the machine of FIG. 10 taken along the line 11—11.
Figure 12:
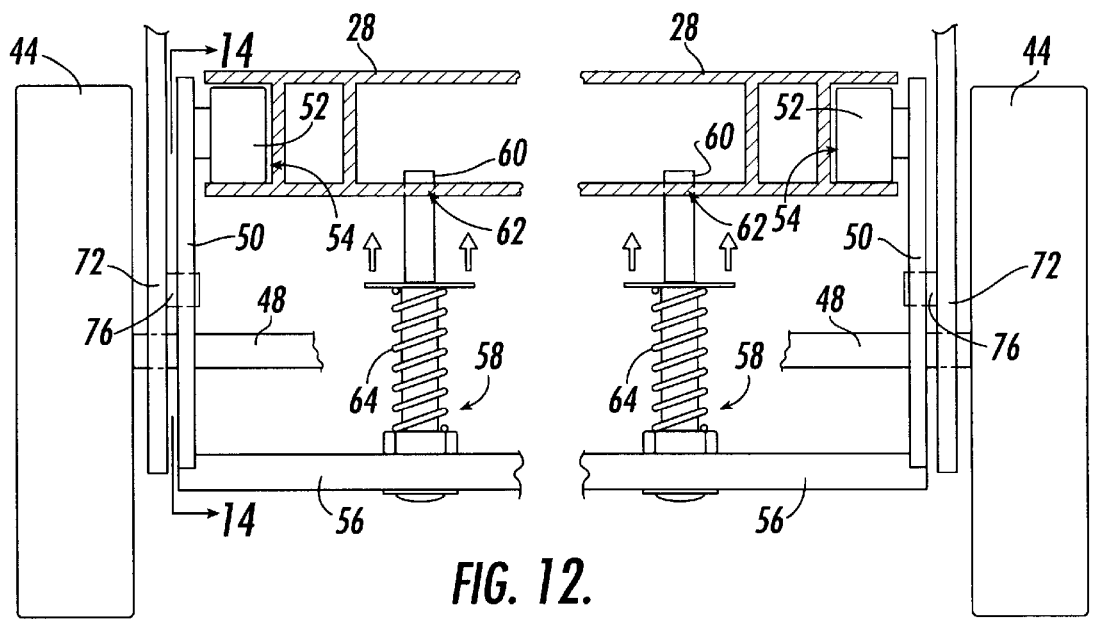
FIG. 12 is an elevational view in cross-section of the portion of the machine of FIG. 6 taken along the line 12—12.
Figure 13:
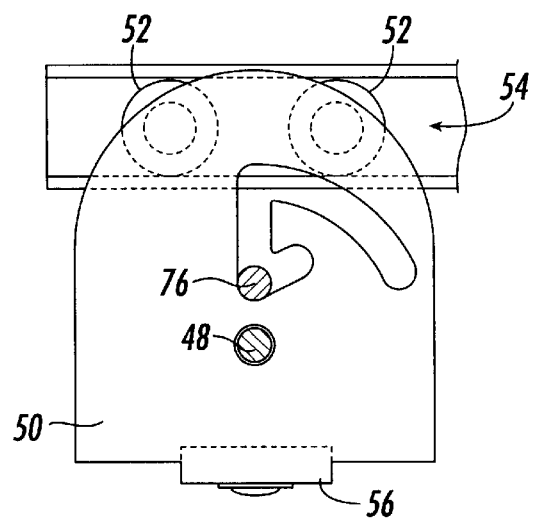
FIG. 13 is an elevational view in cross-section of the portion of the machine of FIG. 12 taken along the line 13—13.

With particular regard to FIGS. 8 and 9, the front wheels 44 are shown in the first position for use of the machine 40 as a buffer. In FIGS. 10 and 11 the locking pins 58 have been withdrawn from the openings 62, and the front wheels 44 and mounting brackets 50 have been displaced rearwardly, and in FIGS. 12 and 13 the ends 60 of the locking pins 58 have been reinserted through openings 62 located at the second position for use of the machine 40 as a scrubber.

A safety feature in accordance with the present invention includes the automatic activation of a switch 68 when the front wheels 44 are disposed in the first position for buffing, and the automatic deactivation of the switch 68 when the wheels are disposed in the second and third positions for scrubbing and stripping, respectively. This safety feature is provided in the preferred machine 40 by the disposition of the switch 68 within the chassis 28 at one side thereof in proximity to an opening 62 corresponding to the first position of the front wheels 44 as shown in FIGS. 8 and 9. In this disposition, an end 60 of a locking pin 58 extends through opening 62 and automatically engages and activates the switch 68. Moreover, the switch 68 can only be activated when the locking pin 58 secures the front wheels in the first position and, furthermore, the status of the switch 68 can only be changed indirectly by the withdrawal of the locking pin 58 if the machine 40 is tilted back on its rear wheels 46 for exposing of the mounting wheel assembly structure.

The switch 68 is connected to the motor 30 such that activation of the switch 68 results in the input shaft 10 of the gearbox arrangement 100 being driven in the first input direction. The rotation of the input shaft 10 in the first input direction results in engagement of the first unidirectional clutch 18 and slippage of the second unidirectional clutch 28, whereby gear reduction unit is bypassed. Thus, when the front wheels 44 are locked in the first position for use of the machine 40 as a buffer, a buffing pad mounted within the pad housing 34 is driven by rotation of the output shaft 14 at the higher rotational speed. Deactivation of the switch 68 results in the input shaft 10 being driven in the second input direction. In this direction, the reduction gear unit is not bypassed and a pad mounted within the pad housing 34 is driven by rotation of the output shaft 14 through the gear reduction unit at the lower rotational speed.

Since the switch 68 controlling reversal of the direction of rotation of the input shaft 10 is disposed beneath the chassis 28 of the machine 40 and is automatically activated when the machine 40 is adjusted for buffing, an accidental reversal of the input shaft 10 during running of the machine 40—which could likely damage the gearbox arrangement 100—is avoided. Moreover, since the switch can only be accessed from the underside of the chassis 28, the machine 40 must be tilted back on the rear wheels 46 in order to gain access to the switch 68 and, consequently, the machine 40 must be turned off before the wheels 44 can be moved and, thus, the status of the switch 68 changed. Additionally, it is noted that the requirement that the machine 40 be tilted back on the rear wheels 46 is not an inconvenience, as the pad mounted within the pad housing 34 should be changed when switching between buffing, scrubbing, and stripping.

To facilitate tilting of the machine 40 for adjusting the position of the front wheels as well as changing the pad mounted within the pad housing 34, the handlebar assembly 38 of the machine includes a U-shaped base 70 whose two arms 72 extend between the front wheels 44 and the mounting brackets 50. With particular regard to FIGS. 14–19, each arm 72 defines therein an elongate, linear guide slot 74 through which axle 48 extends, and each arm 72 includes a guide pin 76 which extends within a nonlinear guide slot 78 formed within each support bracket 50. The extension of the axle 48 through guide slots 74 of the arms 72 and the extension of the guide pins 76 through the guide slots 78 of the support brackets 50 serve to secure the base 70 of the handlebar assembly 38 to the chassis 28 of the machine 40 within a limited range of movement between several selected positions.

Figure 14:
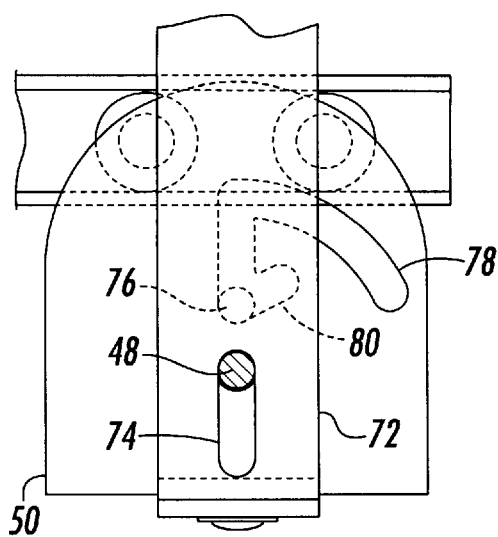
FIG. 14 is an elevational view in cross-section of the portion of the machine of FIG. 12 taken along the line 14—14.
Figure 15:
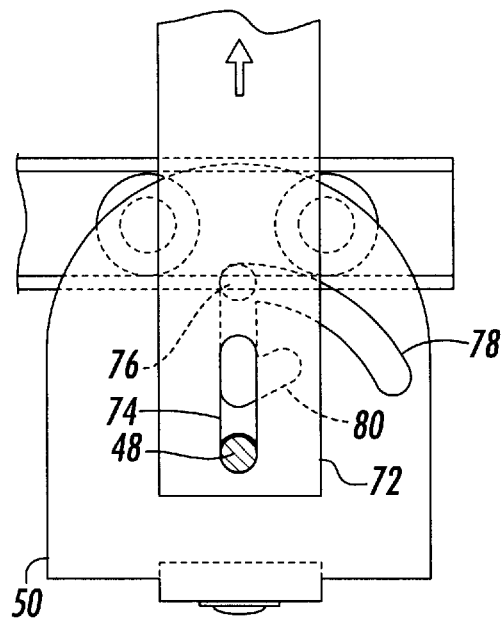
FIG. 15 is another elevational view in accordance with FIG. 14.
Figure 16:
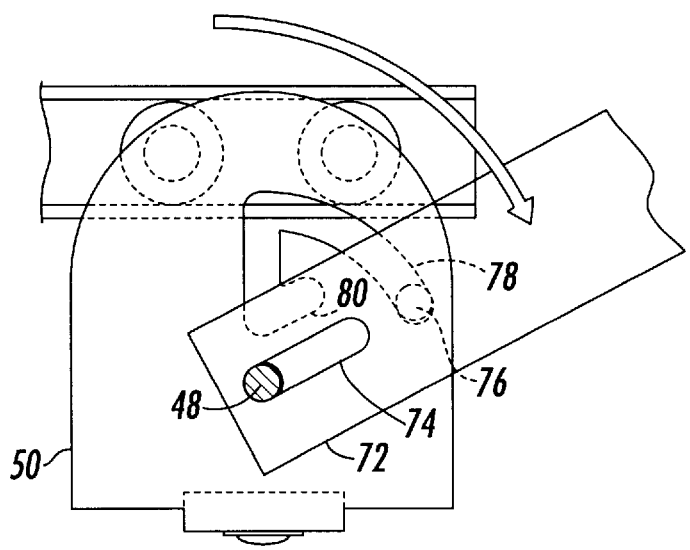
FIG. 16 is another elevational view in accordance with FIG. 14.

For example, in FIG. 14, the handlebar assembly 38 is disposed in an upright position for when the machine 40 is not in use. To lower the handlebar assembly 38 into a position for operation of the machine 40, as shown in FIG. 4, for example, an upward force is applied to the handlebar assembly 38 whereby the arms 72 are moved relative to the axle 48 so that the axle 48 shifts to the bottom of the guide slots 74 and the guide pins 76 are moved to the top of the guide slots 78, as shown in FIG. 15. The handlebar assembly 38 is then pivoted about the axle 48 in the downward direction to an inclined position relative to the chassis 28 for operation of the machine 40, as shown in FIG. 16. In this position, the axle 48 remains at the bottom of the guide slots 74 and the guide pins 76 are moved relative to the mounting brackets 50 along the curved arc of the guide slot 78.

Figure 17:
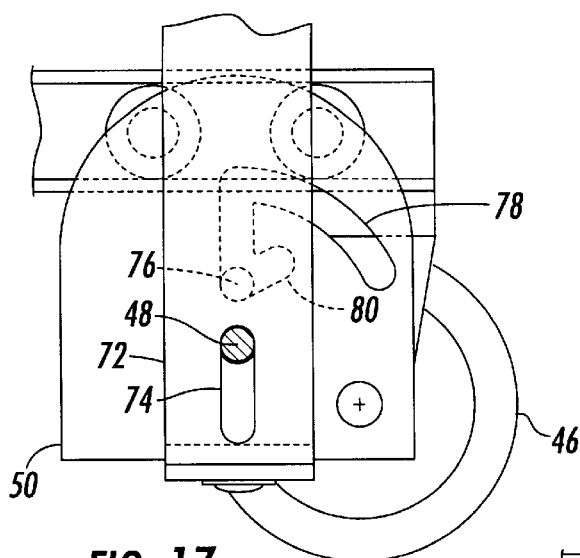
FIG. 17 is an elevational view in cross-section of a portion of the machine of FIG. 4.
Figure 18:
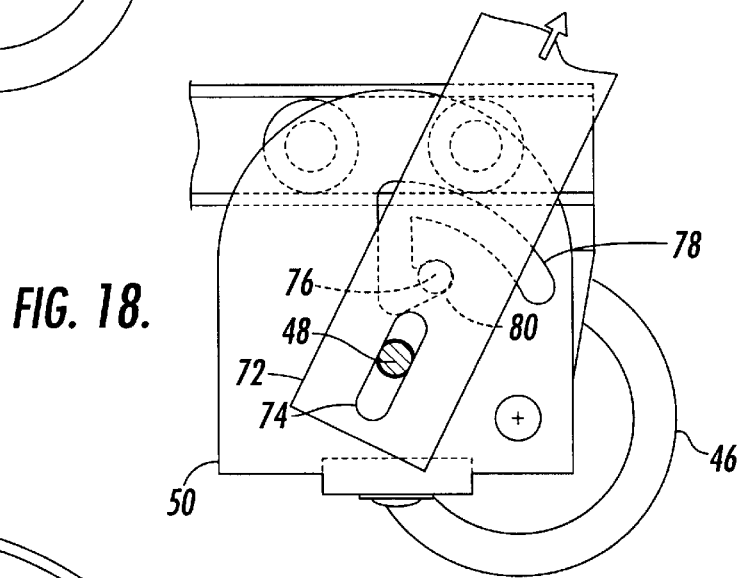
FIG. 18 is another elevational view in cross-section of the portion of the machine of FIG. 17.
Figure 19:
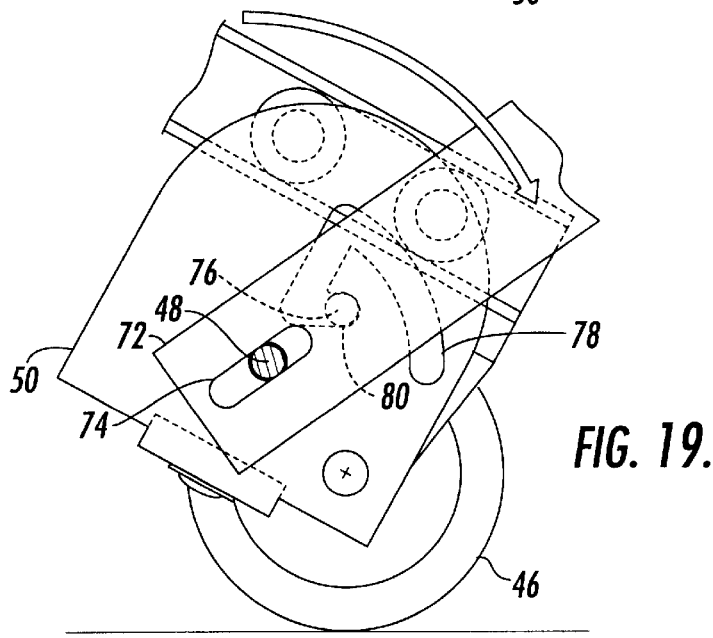
FIG. 19 is a third elevational view in cross-section of the portion of the machine of FIG. 17.

In FIG. 17 the handlebar assembly 38 is again in the upright storage position and the front wheels are, for example, in the third position, i.e., the machine 40 is adjusted for stripping. In order to pivot the machine 40 back to gain access to the underside of the chassis 28, the handlebar assembly 38 is simultaneously pulled upward and backward such that the arms 72 are moved relative to the axle 48 so that the axle 48 shifts downward within the guide slots 74 and each of the guide pins 76 is moved to within a notch 80 formed in each of the guide slots 78 as shown in FIG. 18. At this point a downward force on the handlebar assembly 38 about the rear wheels 46, as shown in FIG. 19, results in pivoting of the entire machine 40 about the rear wheels, the disposition of the guide pins 76 within the notches 80 prevents slipping of the guide pins 76 within the guide slots 78. Consequently, the machine 40 readily can be tilted back about the axle 48 to expose the underneath of the chassis 28.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor to be construed to limit the present invention or otherwise to exclude any such other embodiments, adaptations, variations, modifications and equivalent arrangements, the present invention being limited only by the claims appended hereto and the equivalents thereof.

Thus, for example, while the output gear is illustrated as being formed as part of the output shaft, the indicated configuration is not required and the output gear may be manufactured independently from the output shaft and keyed to the output shaft during assembly of the gearbox arrangement. In either case, the output gear is considered integral with the output shaft. In another example of a modification within the scope of the invention, the motor used to drive rotation of the input shaft is not reversible, but the motor is connected to drive rotation of the input shaft through some other conventional arrangement that, itself, is capable of reversing the direction of rotation of the input shaft.

What is claimed is:

1. A gearbox arrangement, comprising:
   (a) an input shaft having an input gear integral therewith;
   (b) an output shaft having an output gear integral therewith;
   (c) a first unidirectional clutch coupling said input shaft with said output shaft such that rotation of said input shaft in a first input direction at a first input speed rotates said output shaft in a first output direction at a first output speed, but rotation of said input shaft in a second, opposite input direction causes said first unidirectional clutch to slip;
   (d) an idler gear intermeshed with and driven by said input gear;
   (e) an intermediate shaft having a first intermediate gear integral therewith, said first intermediate gear intermeshed with and driven by said idler gear;
   (f) a second intermediate gear intermeshed with said output gear; and
   (g) a second unidirectional clutch coupling said second intermediate gear with said intermediate shaft such that rotation of said input shaft in said second input direction at a second input speed rotates said output shaft in said first output direction at a second output speed, but rotation of said input shaft in said first input direction causes said second unidirectional clutch to slip.

2. The gearbox arrangement of claim 1, wherein said input shaft is coaxial with said output shaft.

3. The gearbox arrangement of claim 1, wherein said first and second unidirectional clutches are disposed in coplanar relation.

4. The gearbox arrangement of claim 1, wherein said first unidirectional clutch is interposed within said output gear.

5. The gearbox arrangement of claim 1, wherein said second unidirectional clutch is interposed within said second intermediate gear.

6. The gearbox arrangement of claim 1, wherein said output gear is formed as part of said output shaft.

7. The gearbox arrangement of claim 1, wherein said input gear, said idler gear, and said first intermediate gear are disposed in coplanar relation.

8. The gearbox arrangement of claim 1, wherein said first output speed differs from said second output speed when said first input speed equals said second input speed.

9. The gearbox arrangement of claim 1, wherein said first and second input speeds each equal approximately 2000 rpm and wherein said first output speed equals approximately 2000 rpm and said second output speed equals approximately 300 rpm.

10. A floor maintenance machine for maintaining a floor surface, comprising:
   (a) a chassis;
   (b) a motor and a gearbox secured to said chassis; and
   (c) a location on said chassis for mounting of a pad for driven rotation thereof by said motor through said gearbox;
   (d) said gearbox including an arrangement therein comprising,
      (i) an input shaft having an input gear integral therewith,
      (ii) an output shaft having an output gear integral therewith,
      (iii) a first unidirectional clutch coupling said input shaft with said output shaft such that rotation of said input shaft in a first input direction at a first input speed rotates said output shaft in a first output direction at a first output speed, but rotation of said input shaft in a second, opposite input direction causes said first unidirectional clutch to slip,
      (iv) an idler gear intermeshed with and driven by said input gear,
      (v) an intermediate shaft having a first intermediate gear integral therewith, said first intermediate gear intermeshed with and driven by said idler gear,
      (vi) a second intermediate gear intermeshed with said output gear, and
      (vii) a second unidirectional clutch coupling said second intermediate gear with said intermediate shaft such that rotation of said input shaft in said second input direction at a second input speed rotates said output shaft in said first output direction at a second output speed, but rotation of said input shaft in said first input direction causes said second unidirectional clutch to slip.

11. The floor maintenance machine of claim 10, further including a switch disposed within said chassis the activation of which determines the direction of rotation of said input shaft.

12. The floor maintenance machine of claim 11, wherein said switch is only accessible for activation and deactivation from underneath said chassis.

* * * * *